(12) United States Patent
Rogers et al.

(10) Patent No.: US 10,707,549 B2
(45) Date of Patent: Jul. 7, 2020

(54) MICROSTRIP TO WAVEGUIDE TRANSITION SYSTEMS AND METHODS

(71) Applicant: The Boeing Company, Chicago, IL (US)

(72) Inventors: John E. Rogers, Owens Cross Roads, AL (US); Corey M. Thacker, Madison, AL (US)

(73) Assignee: The Boeing Company, Chicago, IL (US)

( * ) Notice: Subject to any disclaimer, the term of this patent is extended or adjusted under 35 U.S.C. 154(b) by 269 days.

(21) Appl. No.: 15/950,130

(22) Filed: Apr. 10, 2018

(65) Prior Publication Data

US 2019/0312326 A1    Oct. 10, 2019

(51) Int. Cl.

| | |
|---|---|
| *H01P 5/08* | (2006.01) |
| *H01Q 1/28* | (2006.01) |
| *H01Q 19/06* | (2006.01) |
| *H01Q 13/10* | (2006.01) |
| *H01Q 21/00* | (2006.01) |
| *H01Q 3/26* | (2006.01) |
| *H01Q 1/48* | (2006.01) |
| *G01S 13/935* | (2020.01) |

(52) U.S. Cl.
CPC .............. *H01P 5/08* (2013.01); *G01S 13/935* (2020.01); *H01Q 1/28* (2013.01); *H01Q 1/48* (2013.01); *H01Q 3/2658* (2013.01); *H01Q 13/106* (2013.01); *H01Q 19/06* (2013.01); *H01Q 21/0075* (2013.01); *H01Q 21/0087* (2013.01)

(58) Field of Classification Search
CPC ........... G01S 13/935; G01S 1/02; H01Q 1/28; H01Q 1/48; H01Q 3/22; H01Q 2/34; H01Q 3/42; H01Q 3/2658; H01Q 13/106; H01Q 19/06; H01Q 21/0075; H01Q 21/0087; H01Q 25/00
USPC ......................................................... 342/371
See application file for complete search history.

(56) References Cited

U.S. PATENT DOCUMENTS

| | | | |
|---|---|---|---|
| 2013/0127563 A1* | 5/2013 | Gritters | H01P 5/107 333/26 |
| 2016/0204514 A1* | 7/2016 | Miraftab | H01Q 21/005 343/737 |
| 2018/0191073 A1* | 7/2018 | Celik | H01Q 1/38 |
| 2018/0205151 A1* | 7/2018 | Celik | H01Q 9/0435 |

(Continued)

OTHER PUBLICATIONS

Grabherr et al., "Microstrip to Waveguide Transition Compatible With MM-Wave Integrated Circuits", IEEE Transactions on Microwave Theory and Techniques, Sep. 1994, pp. 1842-1843, vol. 42, No. 9, IEEE, Piscataway, NJ.

(Continued)

*Primary Examiner* — Harry K Liu
(74) *Attorney, Agent, or Firm* — Haynes and Boone, LLP (57) ABSTRACT

A radio frequency (RF) assembly that includes a microstrip to waveguide transition is described herein. In one example, the RF assembly can include a substrate, a microstrip, and a waveguide. The substrate can include an antenna that includes an antenna slot. A portion of the microstrip, such as an end of the microstrip, can be disposed within and/or underneath the antenna slot. The microstrip can be embedded within the substrate and can be electrically coupled to the antenna. At least a portion of the waveguide can be disposed over the antenna slot.

20 Claims, 8 Drawing Sheets

(56) References Cited

U.S. PATENT DOCUMENTS

2019/0148837 A1\* 5/2019 Haven .................. H01Q 13/10

OTHER PUBLICATIONS

Iizuka et al., "Millimeter-Wave Microstrip Line to Waveguide Transition Fabricated on a Single Layer Dielectric Substrate", R&D Review of Toyota CRDL, Jun. 2002, pp. 13-18, vol. 37, No. 2, IEICE Transactions on Communications.
Kaneda et al., "A Broadband Microstrip-to-Waveguide Transition Using Quasi-Yagi Antenna", IEEE Transactions on Microwave Theory and Techniques, Dec. 1999, pp. 1-4, vol. 47, Issue 12, IEEE, Piscataway, NJ.
Lin et al., "CPW to Waveguide Transition with Tapered Slotline Probe", IEEE Microwave and Wireless Components Letters, Jul. 2001, pp. 314-316, vol. 11, No. 7, IEEE, Piscataway, NJ.
Ponchak et al., "A New Rectangular Waveguide to Coplanar Waveguide Transition", NASA Technical Memorandum 102477, May 8-10, 1990, 4 Pages, 1990 IEEE MTT-S International Microwave Symposium, Dallas, TX.
Simon et al., "A Novel Coplanar Transmission Line to Rectangular Waveguide Transition", 1998 IEEE MTT-S International Microwave Symposium Digest, Jun. 7-12, 1998, pp. 257-260, IEEE, Piscataway, NJ.

\* cited by examiner

MICROSTRIP TO WAVEGUIDE TRANSITION SYSTEMS AND METHODS

TECHNICAL FIELD

The disclosure relates generally to signal transmission and receiving systems and more specifically to radio frequency (RF) assemblies that include a microstrip to waveguide transition utilizing an embedded microstrip and slot antenna to propagate signals into the waveguide.

BACKGROUND

Waveguides are used in RF applications for low-loss signal propagation. However, waveguides are typically incompatible with electronics, thus necessitating use of a waveguide-to-coax adapter to transition from the waveguide to the electronics or vice versa. Furthermore, conventional waveguide-to-coax adapters are size, weight, and power (SWaP) constrained and can be cost prohibitive.

SUMMARY

Systems and methods are disclosed for a microstrip to waveguide transition. A certain example discloses a microstrip to waveguide transition disposed within an RF assembly that includes a composite substrate including an antenna, where the antenna comprises an antenna slot, a microstrip embedded within the composite substrate, including a first microstrip end disposed under the antenna slot, and electrically coupled to the antenna, and a waveguide including a first waveguide end and a second waveguide end, wherein the first waveguide end is disposed over the antenna.

Another example discloses a method of manufacturing the RF assembly including forming a first dielectric layer of the composite substrate, forming the microstrip above the first dielectric layer, forming a second dielectric layer of the composite substrate above the microstrip, forming an antenna layer of the composite substrate above the second dielectric layer, and disposing the waveguide over the antenna layer.

The scope of the invention is defined by the claims, which are incorporated into this section by reference. A more complete understanding of the disclosure will be afforded to those skilled in the art, as well as a realization of additional advantages thereof, by a consideration of the following detailed description of one or more implementations. Reference will be made to the appended sheets of drawings that will first be described briefly.

BRIEF DESCRIPTION OF THE DRAWINGS

Examples of the disclosure and their advantages are best understood by referring to the detailed description that follows. It should be appreciated that like reference numerals are used to identify like elements illustrated in one or more of the figures.

DETAILED DESCRIPTION

Various examples of RF assemblies with a microstrip to waveguide transition are disclosed herein. Such RF assemblies can include a composite substrate that includes an antenna, a microstrip embedded within the composite substrate, and a waveguide. The antenna can include an antenna slot. The microstrip can include a first microstrip end disposed under the antenna slot. The waveguide can include a first waveguide end and a second waveguide end with the first waveguide end disposed over the antenna. The microstrip and antenna can be aperture coupled and, with the waveguide disposed over the antenna, provide efficient signal transmission and reception within a desired frequency range.

Figure 1:
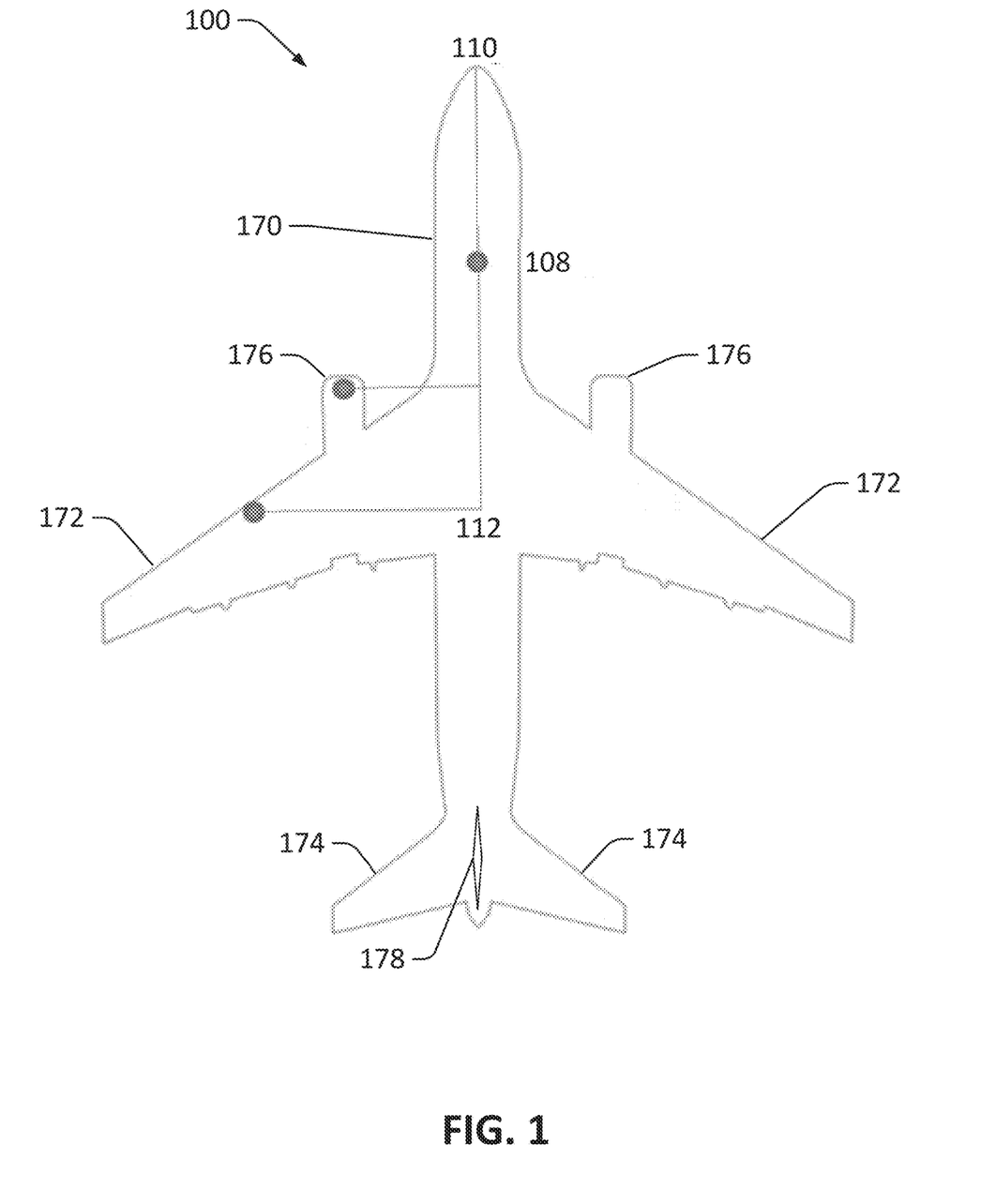
FIG. 1 illustrates an aircraft in accordance with an example of the disclosure.

FIG. 1 illustrates an aircraft in accordance with an example of the disclosure. The aircraft 100 of FIG. 1 can include fuselage 170, wings 172, horizontal stabilizers 174, aircraft engines 176, and vertical stabilizer 178. Additionally, aircraft 100 can include guidance electronics 110, controller 108, and communications channel 112.

Aircraft 100 described in FIG. 1 is exemplary and it is appreciated that in other examples, aircraft 100 can include more or less components or have alternate configurations. Additionally, concepts described herein can be extended to other aircraft such as helicopters, drones, missiles, etc.

Guidance electronics 110 can be navigational electronics or a portion thereof and can be disposed within fuselage 170, wings 172, horizontal stabilizers 174, vertical stabilizer 178, and/or another portion of aircraft 100. Guidance electronics 110 can include a radar sender and/or receiver unit such as a phased array and/or another such radar, lidar, and/or appropriate guidance electronic. Guidance electronics 110 that include phased arrays can be a low power steerable array (LPSA). Such guidance electronics are described further herein.

Guidance electronics 110, other sensors, and/or electronics of aircraft 100 can provide data (e.g., radar data) to and receive data (e.g., operating instructions) from controller 108 via communications channel 112. Communications channel 112 can, for example, be either a wired or a wireless communications system. Communications channel 112 can link various components of aircraft 100 to the controller 108.

Controller 108 can include, for example, a microprocessor, a microcontroller, a signal processing device, a memory storage device, and/or any additional devices to perform any of the various operations described herein. In various examples, controller 108 and/or its associated operations can be implemented as a single device or multiple connected devices (e.g., communicatively linked through wired or wireless connections such as communications channel 112) to collectively constitute controller 108.

Controller 108 can include one or more memory components or devices to store data and information. The memory can include volatile and non-volatile memory. Examples of such memory include RAM (Random Access Memory), ROM (Read-Only Memory), EEPROM (Electrically-Erasable Read-Only Memory), flash memory, or other types of memory. In certain examples, controller 108 can be adapted to execute instructions stored within the memory to perform various methods and processes described herein, including implementation and execution of control algorithms responsive to sensor and/or operator (e.g., flight crew) inputs.

Figure 2:
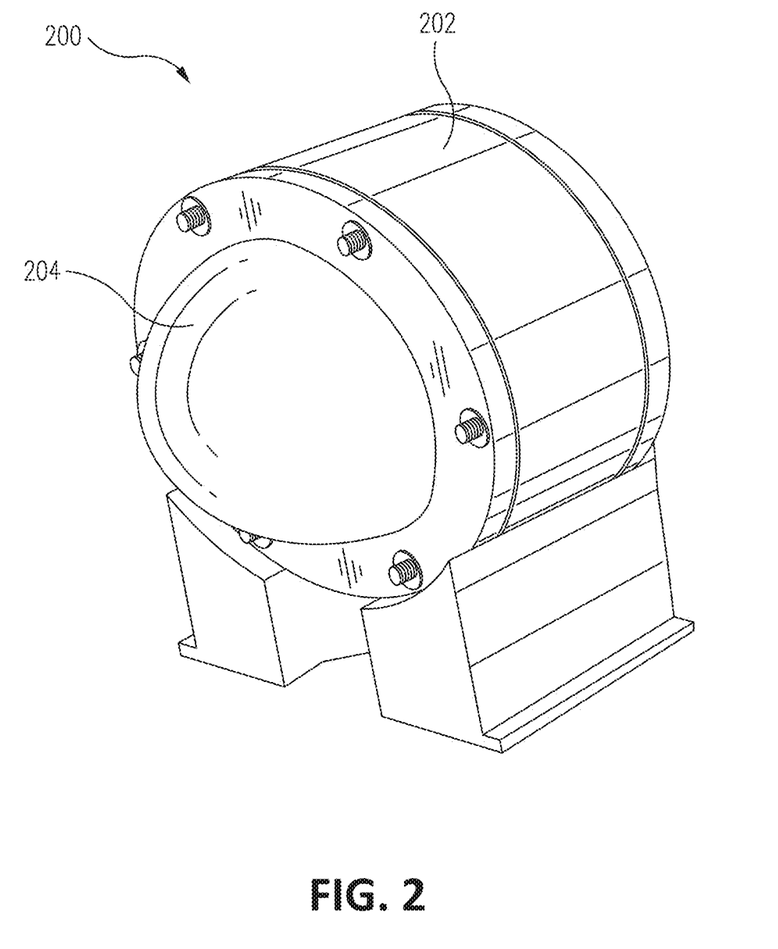
FIG. 2 illustrates a phased array in accordance with an example of the disclosure.

FIG. 2 illustrates a phased array in accordance with an example of the disclosure. Phased array 200 of FIG. 2 can include waveguide assembly 202 and lens 204. Lens 204 can be a dielectric lens. Waveguide assembly 202 can include a plurality of waveguides disposed herein. The waveguide assembly 202 can include an RF assembly that includes one or more microstrips, antennas, and waveguides coupled to corresponding antennas.

The antenna can include a slot aperture coupled to one end of the microstrip to receive and/or transmit signals from the microstrip. The antenna slot can be shaped to effectively receive and/or transmit (i.e., radiate) such signals. The waveguide can be configured to further effectively receive and/or transmit signals that are electrically coupled to the antenna. In certain examples, the waveguide can have dimensions that correspond to the desired frequency range for efficient signal propagation. Furthermore, the waveguide can be mated directly to the RF board and placed over the antenna.

For the purposes of this disclosure, electrically coupled, capacitively coupled, and aperture coupled refer to an interaction between the microstrip and the antenna or the antenna and the waveguide for propagation of radio signals.

Figure 3:
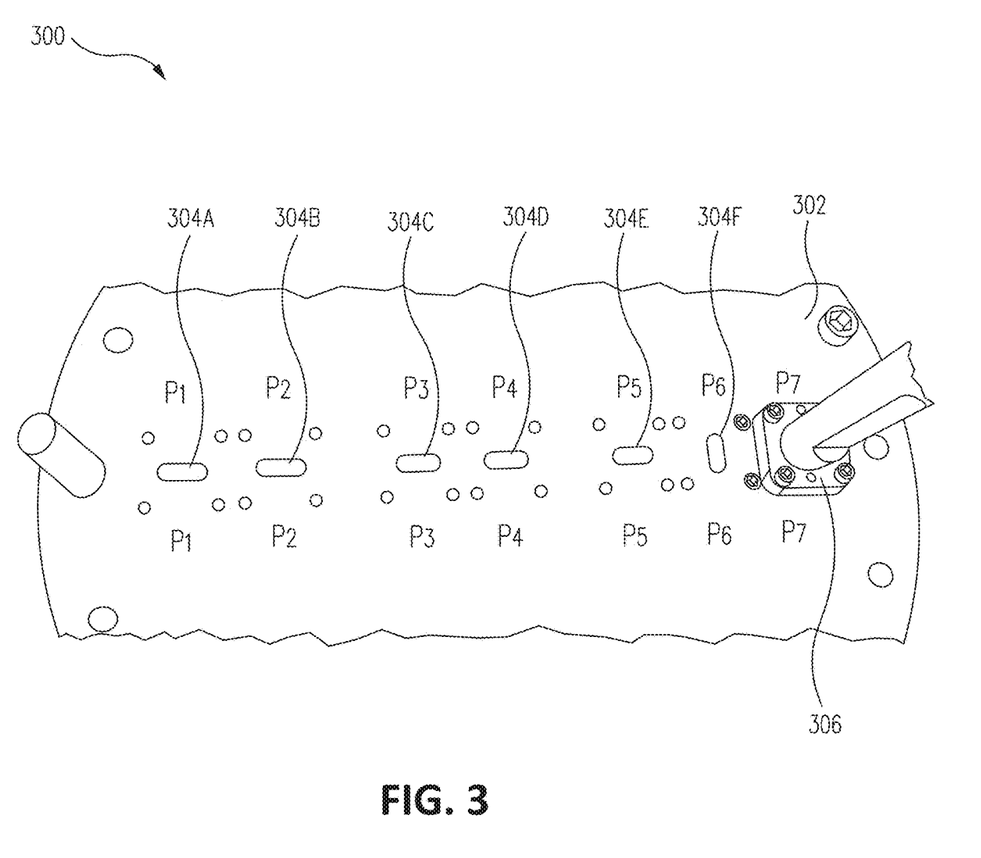
FIG. 3 illustrates a waveguide array in accordance with an example of the disclosure.

FIG. 3 illustrates a waveguide array in accordance with an example of the disclosure. FIG. 3 illustrates waveguide assembly 300 with waveguide panel 302. A plurality of waveguides 304A-F are disposed within waveguide panel 302. One or more of such waveguides can be electrically coupled to one or more antennas of an RF assembly.

Alternatively, one or more of the plurality of waveguides 304A-F can be electrically coupled to one or more antennas through an interfacing waveguide 306. Interfacing waveguide 306 can receive and/or transmit radio signals.

A phased array with integrated electronics can be formed with such lens, waveguides, and electrically coupled antennas. Such a phased array can be used to steer radar beams in a desired direction. In certain examples, radio signals transmitted through antenna elements and corresponding waveguides can be staggered (e.g., the phase of certain signals can be shifted) to provide constructive and/or destructive interference to steer the emitted beams in a desired direction and thus direct electromagnetic waves in the desired direction.

Figure 4:
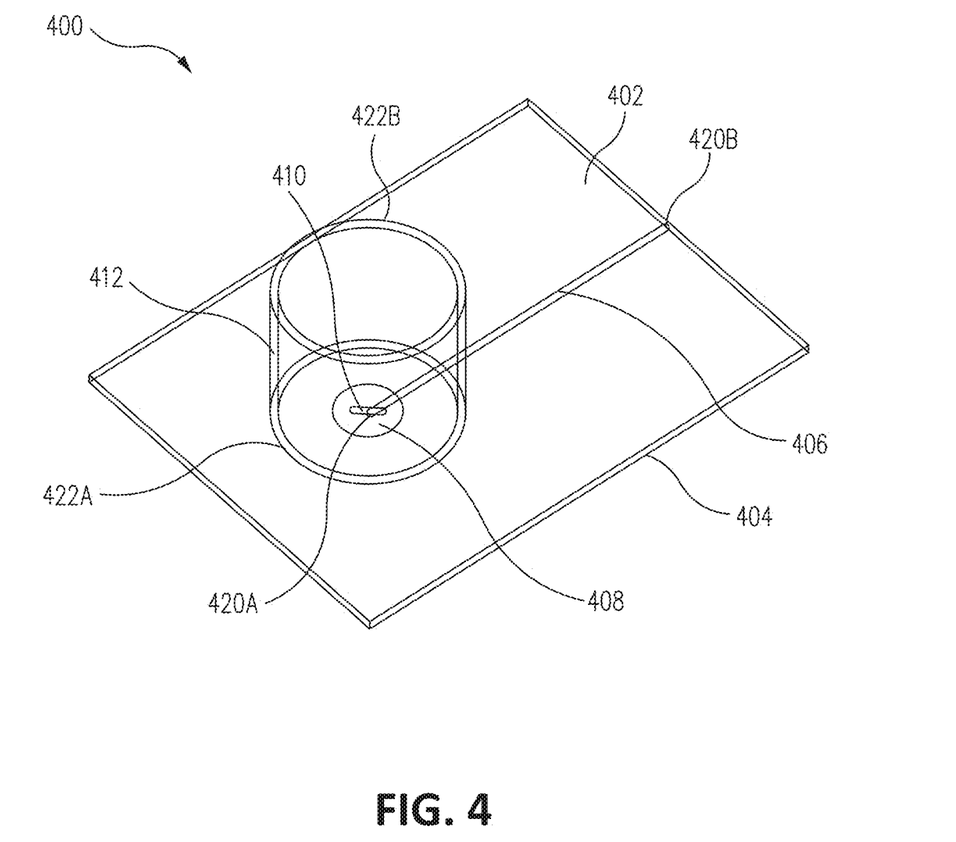
FIG. 4 illustrates a RF assembly in accordance with an example of the disclosure.

FIG. 4 illustrates a RF assembly in accordance with an example of the disclosure. FIG. 4 shows a RF assembly 400 that includes composite substrate 402. Composite substrate 402 includes lower ground plane 404, microstrip 406, antenna 408 that includes antenna slot 410, and waveguide 412.

Composite substrate 402 can be, for example, a RF printed circuit board (PCB) material such as glass, ceramic, polyimide, etc. Composite substrate 402 can include a plurality of different board layers. For example, composite substrate 402 can include one or more dielectric layers, conductive layers, and adhesive layers. Composite substrate 402 can be fabricated using a combination of subtractive (e.g., etch), additive (e.g., print), laminate, and/or other fabrication techniques. Lower ground plane 404 can be disposed on a bottom and/or lower portion of composite substrate 402.

For example, lower ground plane 404 can be disposed below microstrip 406 to provide an electrical return path for microstrip 406. In certain examples, microstrip 406 can be embedded within composite substrate 402. Microstrip 406 can include a first microstrip end 420A and a second microstrip end 420B. Microstrip 406 can be excited by one or more signal sources (not shown) that are electrically connected to microstrip 406.

First end 420A of microstrip 406 can be at least partially disposed under antenna slot 410 of antenna 408. Antenna slot 410 can be a portion of antenna 408. In certain examples, antenna slot 410 can be an aperture within antenna 408. Antenna 408 can be made from any material appropriate for antennas, such as electrically conductive materials. First end 420A of microstrip 406 can be at least partially disposed under antenna slot 410 of antenna 408 to receive and/or transmit electromagnetic radiation through antenna 408 with slot 410.

In certain examples, antenna slot 410 can be oriented relative to microstrip 406 to improve the receiving and/or transmitting of radio signals. For example, the direction of the microstrip line from second end 420B to first end 420A can be termed as a length direction. The antenna slot 410 can further include a major length (e.g., along the length of the direction of antenna slot 410 that is longer) and a minor length (e.g., along the length of the direction of antenna slot 410 that is shorter). In certain such examples, the length direction of microstrip 406 can be oriented at an angle to the major length of antenna slot 410. That is, the length direction can be oriented at an angle to the major length of antenna slot 410. Certain such orientations can be better suited to radiating radio signals within a desired frequency range.

Waveguide 412 can be disposed over antenna 408 with slot 410 and can include a waveguide first end 422A and a waveguide second end 422B. As shown in FIG. 4, waveguide 412 can be a cylindrical waveguide, but other examples can include waveguides of other shapes. Waveguide first end 422A can be disposed on composite substrate 402. Waveguide 412 can be disposed over antenna 408 with slot 410 to propagate radio signals to and from microstrip 406 that pass through antenna 408 with slot 410.

Waveguide 412 can be configured to effectively radiate such radio signals within a desired frequency range. For example, waveguide 412 shown in FIG. 4 is a waveguide with a circular cross-section of a specific radius to effectively radiate radio signals radio signals to and from antenna 408 with slot 410. For example, the radius of waveguide 412 can be configured to effectively radiate radio signals from antenna 408 with slot 410. Furthermore, in certain examples, waveguide 412 can be configured to effectively receive radio signals to microstrip 406.

Thus, antenna 408 with slot 410 can include dimensions such that antenna 408 efficiently radiates within a desired frequency range. Waveguide 412 can also include dimensions corresponding to the desired frequency range for efficient signal propagation.

Lower ground plane 404 can be disposed below microstrip 406. In certain examples, a dielectric layer can be disposed between microstrip 406 and lower ground plane 404. In such examples, lower ground plane 404 and microstrip 406 can be electrically coupled to each other such that the lower ground plane 404 provides an electrical return path for the microstrip 406. Furthermore, in certain examples, microstrip 406 can be electrically coupled to antenna 408. Thus, in such examples, a dielectric layer can be disposed between microstrip 406 and antenna 408.

Figure 5:
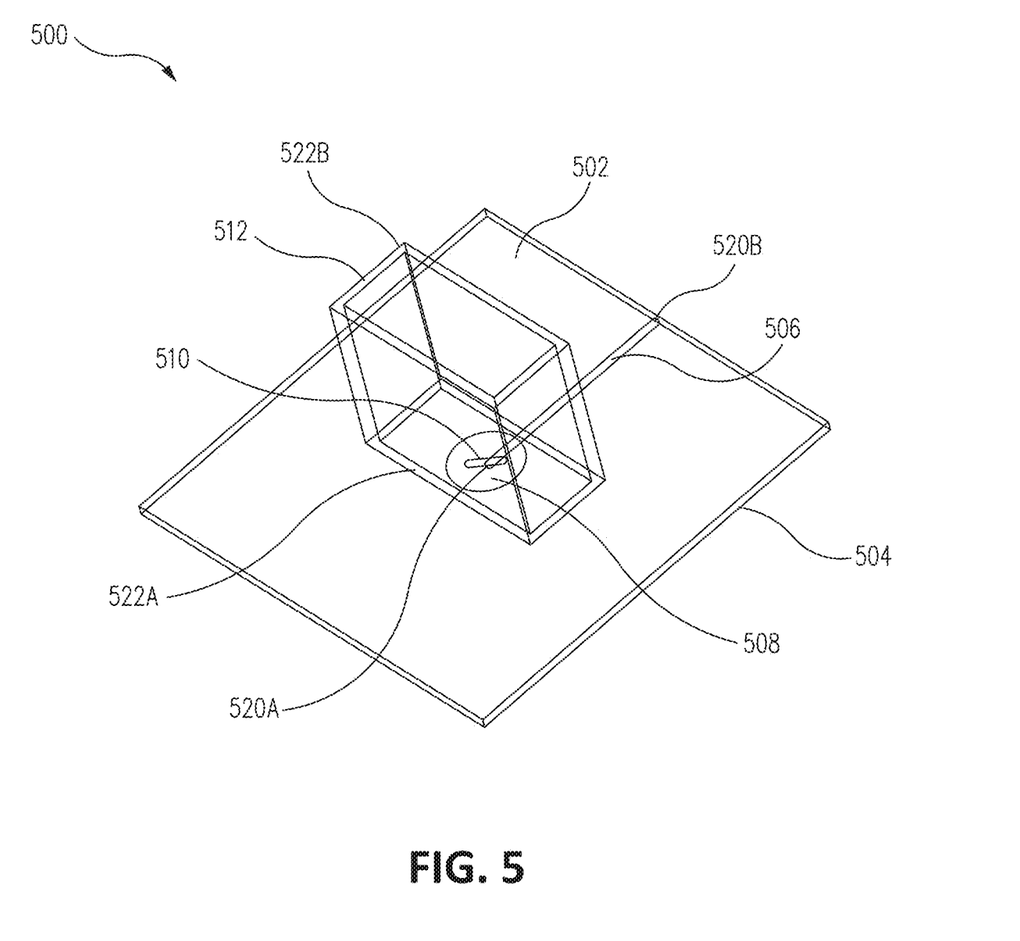
FIG. 5 illustrates another RF assembly in accordance with an example of the disclosure.

FIG. 5 illustrates another RF assembly in accordance with an example of the disclosure. FIG. 5 shows a RF assembly 500 that includes substrate 502 that includes lower ground plane 504, microstrip 506 (including first microstrip end 520A and second microstrip end 520B), antenna 508 that includes antenna slot 510, and waveguide 512 (including waveguide first end 522A and waveguide second end 522B).

Waveguide 512 of RF assembly 500 can be a waveguide with a rectangular cross-section. Such a rectangular cross-section can include a major length (e.g., the longer side of the rectangular cross-section) and a minor length (e.g., the shorter side of the rectangular cross-section). The major length of waveguide 512 can be oriented at an angle relative to the major length of antenna slot 510. Thus, the major length of antenna slot 410 can be oriented at an angle to the major length of rectangular waveguide 512. Furthermore, the length direction of microstrip 506 can be oriented relative to the major length of antenna slot 510. Such orientations of the major length of antenna slot 510 to waveguide 512 and/or the length direction of microstrip 506 to the major length of antenna slot 510 can be configured to effectively radiate and/or receive radio signals within a desired frequency range.

Figure 6:
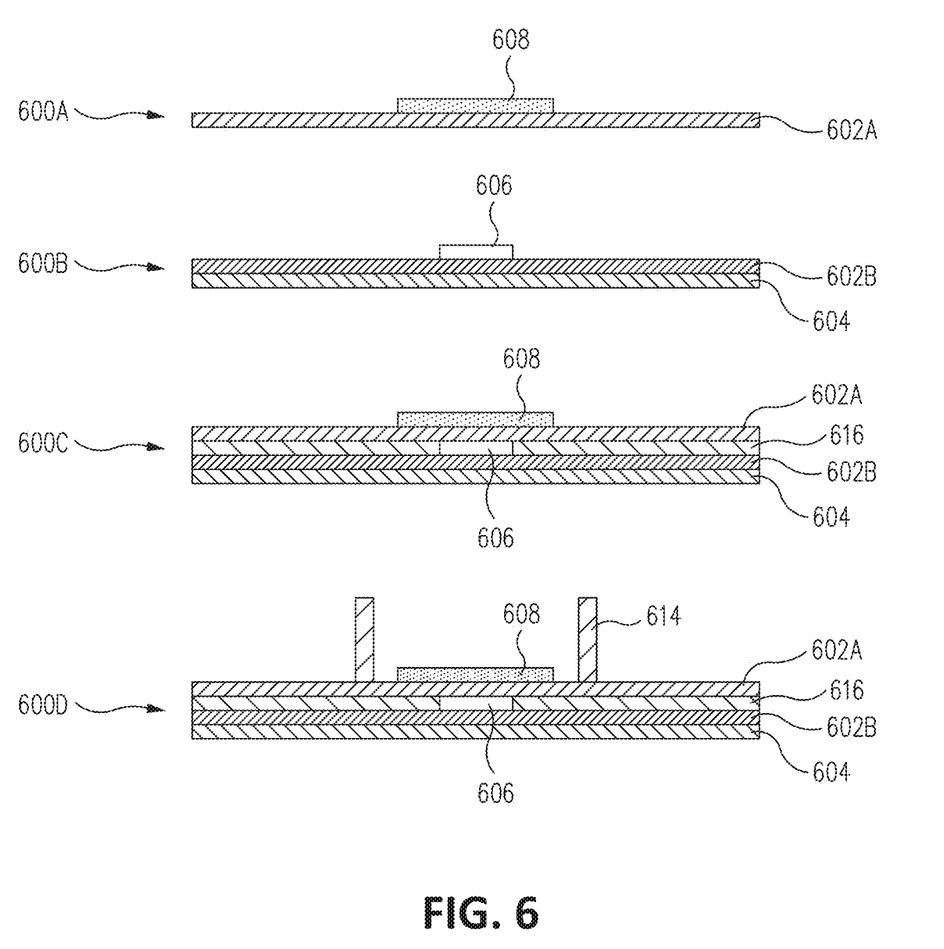
FIG. 6 illustrates a technique for manufacturing the RF assembly in accordance with an example of the disclosure.

FIG. 6 illustrates a technique for manufacturing the RF assembly in accordance with an example of the disclosure. FIG. 6 illustrates steps 600A-D used in the manufacture of RF assemblies. However, other examples can include additional or fewer steps to that shown in FIG. 6.

In step 600A, an electrically conductive layer can be formed (e.g., patterned, laminated, or printed) on dielectric 602A to form antenna 608 or a portion thereof. Antenna 608 can include an antenna slot disposed over a first end of microstrip 606.

Microstrip 606 can be formed in step 600B. In step 600B, an electrically conductive layer can be formed (e.g., patterned, laminated, or printed) on dielectric 602B to form microstrip 606 or a portion thereof. Furthermore, lower ground plane 604 may be formed below dielectric 602B. In the example in FIG. 6 microstrip 606 and lower ground plane 604 are electrically coupled.

In step 600C, the portions of the RF assemblies formed in steps 600A and 600B can be laminated together. For example, the portion formed in step 600A can be disposed on top of the portion formed in step 600B. The two portions can be laminated together with dielectric 616, disposed between dielectric layers 602A and 602B. Any appropriate adhesive that holds together dielectric layers 602A, 602B, and 616 can be utilized.

In step 600D, waveguide 614 is disposed over at least a portion of antenna 608. Waveguide 614 can be mated to dielectric layer 602A or another portion thereof of the RF board. In certain matings to dielectric layer 602A via adhesives, mechanical fasteners, brazing, or other appropriate techniques. Waveguide 614 can be disposed over antenna 608.

Figure 7:
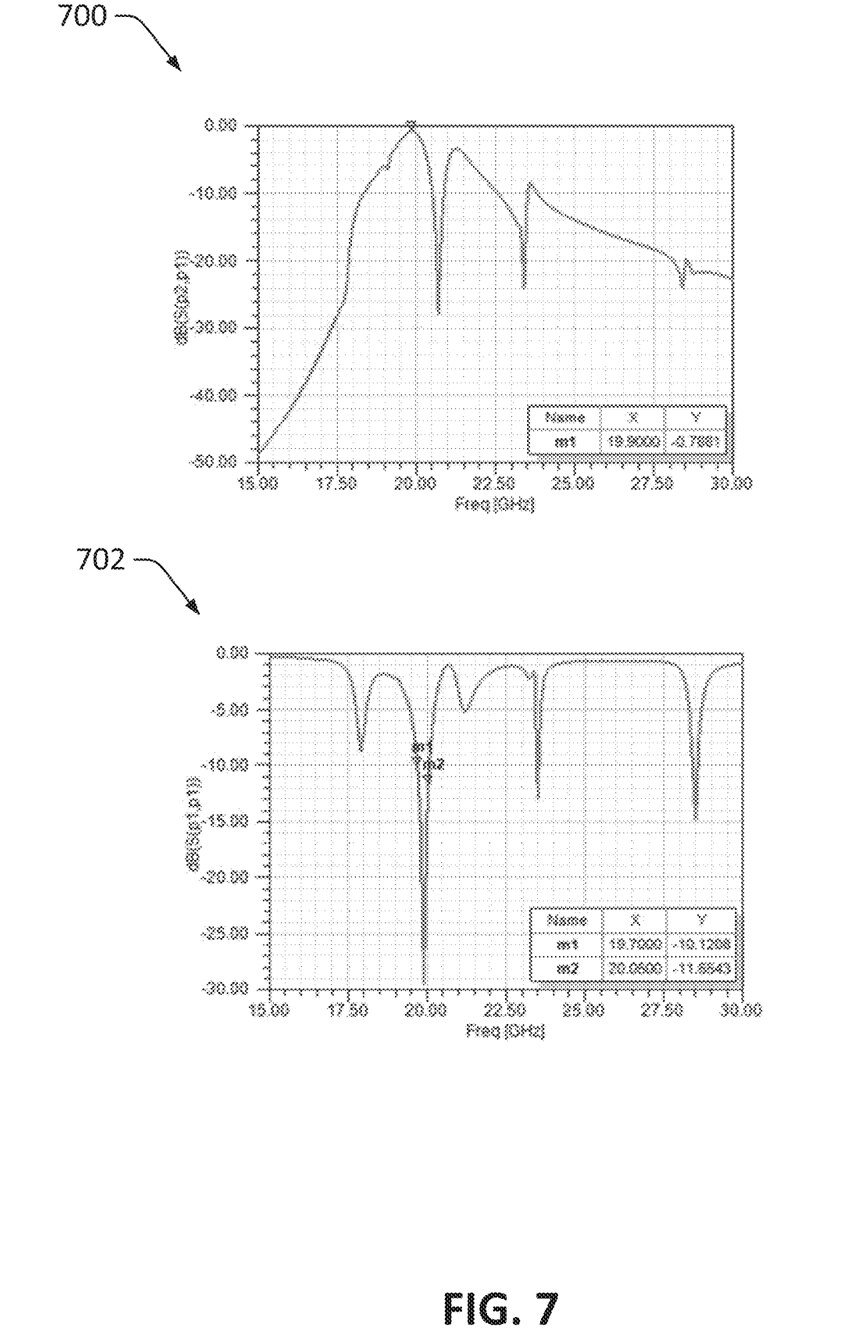
FIG. 7 is an illustration of the performance of a RF assembly in accordance with an example of the disclosure.

FIG. 7 is an illustration of the performance of a RF assembly in accordance with an example of the disclosure. FIG.

7 shows a result of using a finite element method (FEM) solver to predict performance of a microstrip to waveguide transition configured to operate at 20 GHz. Chart 700 shows predicted insertion loss and chart 702 shows predicted return loss. The surface dimensions of the microstrip to waveguide (e.g., RF assembly) simulated is 22 mm×24 mm and the simulated RF board has two layers of 10 mil Pyralux® dielectric material disposed between the lower ground plane and the microstrip and the microstrip and the antenna, respectively. Chart 700 shows a minimum insertion loss of about 0.8 dB is attainable.

Figure 8:
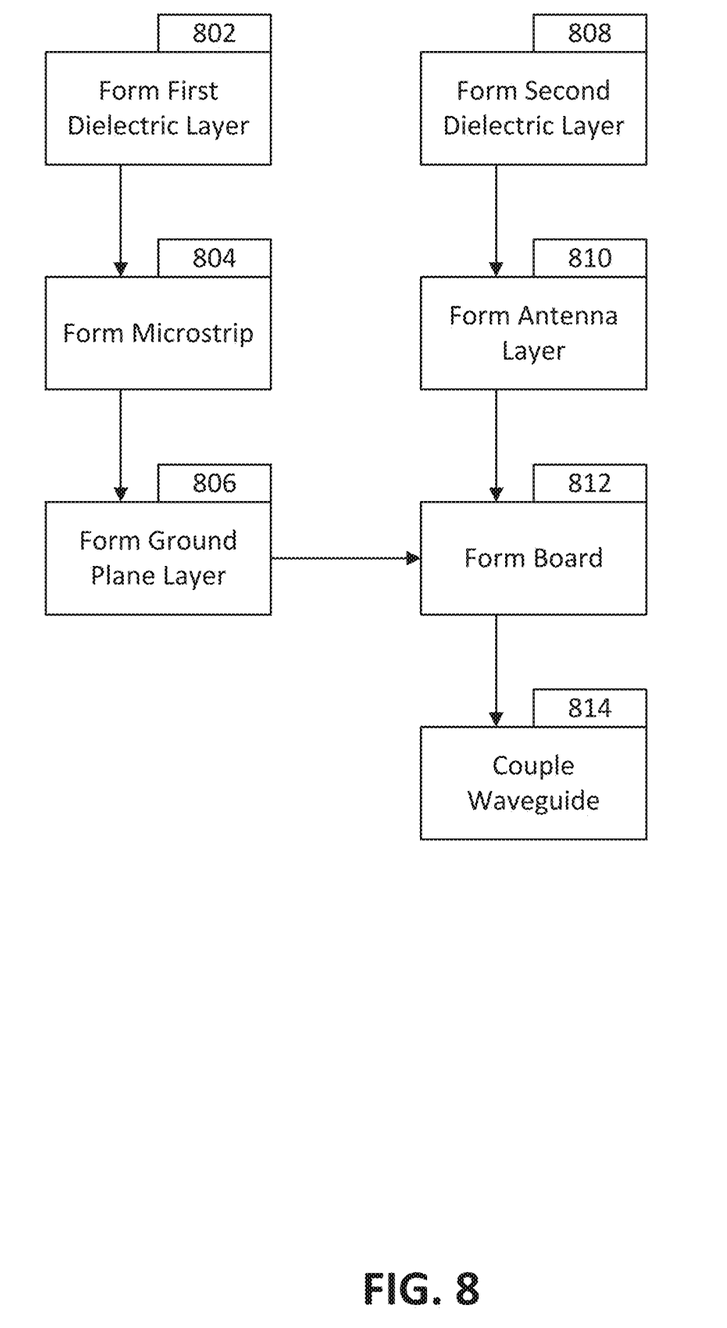
FIG. 8 is a flowchart detailing a method of manufacture of a RF assembly in accordance with an example of the disclosure.

FIG. 8 is a flowchart detailing a method of manufacture of a RF assembly in accordance with an example of the disclosure. In block 802, a first dielectric layer is formed. In block 804, a microstrip is formed on the first dielectric layer. A material appropriate for use as a microstrip can thus be formed (e.g., patterned, laminated, or printed) on the first dielectric layer to form the microstrip or a portion thereof.

In block 806, a ground plane layer can be formed. The ground plane layer can be formed, for example, below the first dielectric layer. In certain such examples, the microstrip can be disposed above the first dielectric layer. In certain other examples, the ground plane layer can be formed first, the first dielectric layer can be formed on top of the ground plane layer, and the microstrip can be formed on top of the first dielectric layer. The dielectric layer-microstrip-ground plane formed in blocks 802-806 can be called a first RF board portion.

In block 808, a second dielectric layer can be formed. In block 810, an antenna layer can be formed above the second dielectric layer. A material appropriate for an antenna can be formed (e.g., patterned, laminated, or printed) on the second dielectric layer to the antenna. The antenna can be formed with an antenna slot. The dielectric layer-antenna formed in blocks 808 and 810 can be called a second RF board portion.

In block 812, the first and second RF board portions can be laminated together to form the RF board. For example, a laminate can be applied to the first and/or second RF board portion to bond and hold the first and second RF board portions together to form a RF board.

In block 814, a waveguide can be mated to the RF board. The waveguide can be positioned over the antenna and configured to transmit signals from the antenna or receive signals to the antenna. Mating the waveguide and the RF board together can then form the RF assembly.

Examples described above illustrate but do not limit the invention. It should also be understood that numerous modifications and variations are possible in accordance with the principles of the present invention. Accordingly, the scope of the invention is defined only by the following claims.

What is claimed is:

1. An apparatus comprising:
   a substrate comprising an antenna, wherein the antenna comprises an antenna slot;
   a microstrip embedded within the substrate, comprising a first microstrip end disposed under the antenna slot, and electrically coupled to the antenna; and
   a waveguide comprising a first waveguide end and a second waveguide end, wherein the first waveguide end is disposed over the antenna.

2. The apparatus of claim 1, wherein the antenna further comprises an antenna layer disposed on a top layer of the substrate, and wherein the antenna layer comprises the antenna slot.

3. The apparatus of claim 2, wherein the substrate further comprises a dielectric layer disposed between the antenna layer and the microstrip.

4. The apparatus of claim 2, wherein the microstrip is electrically coupled to the antenna layer.

5. The apparatus of claim 2, wherein the substrate further comprises a ground plane layer disposed below the microstrip.

6. The apparatus of claim 5, wherein the substrate further comprises a dielectric layer disposed between the ground plane layer and the microstrip.

7. The apparatus of claim 1, wherein a major length of the antenna slot is oriented at an angle to a length direction of the microstrip.

8. The apparatus of claim 1, wherein the waveguide is a cylindrical waveguide.

9. The apparatus of claim 1, wherein the waveguide is a substantially rectangular waveguide.

10. The apparatus of claim 9, wherein a slot major length of the antenna slot is oriented at an angle to a waveguide major length of the waveguide.

11. A steerable array comprising the apparatus of claim 1, wherein the apparatus further comprises a plurality of waveguides, wherein each of the plurality of waveguides comprise a first waveguide end and a second waveguide end, and wherein each of the first waveguide ends is disposed over a corresponding antenna slot.

12. The steerable array of claim 11, wherein the plurality of waveguides are disposed within a waveguide panel.

13. The steerable array of claim 11, wherein the plurality of waveguides are coupled to a phased array.

14. The steerable array of claim 13, wherein the phased array comprises a dielectric lens.

15. An aircraft comprising the steerable array of claim 11, wherein the aircraft further comprises:
 a fuselage; and
 a wing, wherein the steerable array is coupled to the fuselage and/or the wing.

16. The aircraft of claim 15, further comprising a navigational device, wherein the steerable array is communicatively coupled to the navigational device.

17. The aircraft of claim 16, wherein the steerable array is configured to generate directed electromagnetic waves and output radar data based on the generated electromagnetic waves.

18. A method of manufacturing the apparatus of claim 1, the method comprising:
 forming a first dielectric layer of the substrate;
 forming the microstrip above the first dielectric layer;
 forming a second dielectric layer of the substrate above the microstrip;
 forming an antenna layer of the substrate above the second dielectric layer; and
 disposing the waveguide over the antenna slot of the antenna layer.

19. The method of claim 18, further comprising:
 forming a ground plane layer, wherein the first dielectric layer is formed above the ground plane layer.

20. The method of claim 18, wherein the microstrip is patterned or printed on the first dielectric layer, wherein the antenna layer is patterned or printed on the second dielectric layer, and wherein at least a portion of the second dielectric layer is laminated or printed on the first dielectric layer.

* * * * *